Jan. 11, 1955    R. K. A. TOMASCHEK    2,699,062
FORCE RESPONSIVE SPRING DEVICE
Filed May 10, 1950    8 Sheets-Sheet 1

Inventor:
Rudolf Karl Anton Tomaschek
By: Morgan, Finnegan & Durham
Attorneys.

Jan. 11, 1955  R. K. A. TOMASCHEK  2,699,062
FORCE RESPONSIVE SPRING DEVICE
Filed May 10, 1950  8 Sheets-Sheet 2

Inventor:
Rudolf Karl Anton Tomaschek
By: Morgan, Finnegan & Durham
Attorneys.

Jan. 11, 1955     R. K. A. TOMASCHEK     2,699,062
FORCE RESPONSIVE SPRING DEVICE
Filed May 10, 1950                                                  8 Sheets-Sheet 8

Inventor:
Rudolf Karl Anton Tomaschek
By: *Morgan, Finnegan & Durham*
Attorneys.

United States Patent Office 2,699,062
Patented Jan. 11, 1955

2,699,062
FORCE RESPONSIVE SPRING DEVICE

Rudolf Karl Anton Tomaschek, London, England, assignor to Anglo-Iranian Oil Company, Limited, London, England, a British joint-stock corporation Application May 10, 1950, Serial No. 161,166

Claims priority, application Great Britain May 11, 1949

7 Claims. (Cl. 73—133)

The invention relates to instruments including coiled springs. More particularly, it relates to improved measuring, indicating, recording or relaying instruments provided with sensitive coiled springs.

Measuring and indicating instruments conventionally include coiled springs and helical springs. In general loads or distorting forces are applied tangentially to coiled springs and longitudinally to helical springs. In each case a substantially linear relationship exists between stress and strain from zero loading over a range of loadings characteristic of the spring.

It has now been found that if a coiled spring of diminishing radius of curvature towards one end thereof is rigidly fixed at one end and a force applied to the free end at a small angle to the axis of the unloaded spring to distort the spring, there exist under certain conditions of magnitude and direction of the applied force, as hereinafter described, one or more zones of high sensitivity which are of particular value when employed as the operating range in a measuring, indicating, recording or relaying instrument of which the spring forms part.

It is an object of the invention to provide an improved instrument for the accurate measurement of a linear force or for the comparison of linear forces of like direction and of closely similar magnitude or which is capable of mechanical response to small variations in the magnitude or direction of a linear force. It is a further object to provide an instrument of high sensitivity for the measurement or comparison of a physical property or conditions or for a mechanical response to changes therein.

These objects are accomplished by the provision of an instrument comprising a coiled spring of material having a cross-section of substantial width/thickness ratio, the spring constituting not substantially less than 1.25 turns in the unextended state, means, attached or adapted to be attached to one end of the spring, capable of linear movement under the action of the linear force, and a mounting for the other end of the spring to support, or adapted to support, the spring so that the axis of the spring, in the unextended state, subtends an angle to the direction of the linear force, the angle being such that, under the influence of the linear force the spring is extended into a state of extreme sensitivity, as hereinafter described.

According to a modification of the instrument according to the invention, there is provided an instrument comprising a coiled spring made of a material having a cross-section of substantial width/thickness ratio, the spring constituting not substantially less than 1.25 complete turns in the unextended state, means attached to or adapted to be attached to one end of the spring, capable of linear movement under the action of the linear force, and a mounting for the other end of the spring to support, or adapted to support, the spring so that the axis of the spring, in the unextended state, subtends an angle to a perpendicular to the direction of the linear force, the angle being such that, under the influence of the force the spring is extended into a state of extreme sensitivity as hereinafter described.

Preferably the angle subtended by the axis of the unextended spring to the direction of the linear force is not less than 5° and in most cases satisfactory performance is obtained when the angle lies in the range 10°–40°. The ratio of the width/thickness of the spring is preferably in the range 10–100. If the ratio exceeds 100, in most cases the windings will touch during extension thereby interfering with the correct performance of the spring.

The spring used according to the invention may be of any metal or alloy conventionally employed in the construction of springs, for example, steel, "Invar" and beryllium-copper alloys.

Preferably, the coiled spring in the undistorted state aproximates to a circular form. Alternatively the spring may take the form of other curved shapes, for example, elliptical, parabolic or hyperbolic or combinations of these or other shapes.

The determination of the zone of extreme sensitivity is illustrated with reference to Figures 1 to 7 of the accompanying drawings in which.

Figure 1:
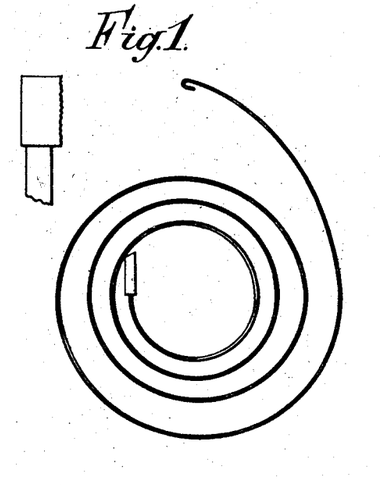
Figure 1 is a plan view of a coiled spring in the unextended state.

The coiled spring employed (Figs. 1–7) had the following dimensions:

| | | |
|---|---|---|
| Length along the spiral | cms | 73.5 |
| Width | mm | 9 |
| Thickness | mm | 0.2 |
| Thus area of cross-section | sq. cm | 1.8 |
| Ratio of width/thickness | | 45 |

Free of distorting forces the spring had 3¾ windings, and the outer end was approximately 15 mm. from the centre of the geometric form.

The spring 1 was clamped at its inner end in a substantially horizontal plane and extended by attaching a mass to its free end.

At the outer end of the spiral spring a scale was attached by means of a ring. The sinking of the scale was measured by means of a mirror rule. The horizontal projection of the twist of the outer end of the spiral spring was measured by the twist of the scale. An arrow was secured to the scale to extend horizontally. A small source of light projected the shadow of the arrow on to a sheet of paper disposed in a horizontal plane. The two end points of the arrow were marked and later connected by a straight line. The lower end of the spiral spring was left free and in this way the influence of lateral shifting on the reading of the angles was avoided.

Figure 3:
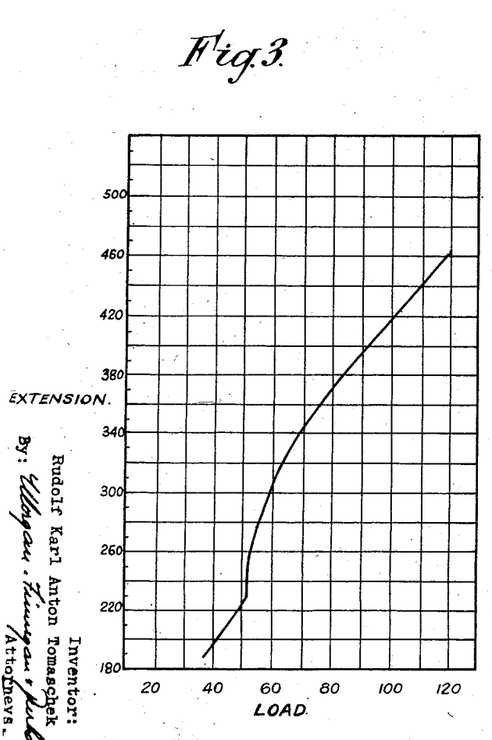
Figures 3 to 7 are graphs indicating the relation of variable functions including angle of mounting, load and sensitivity.

Figure 3 is a plot of the extension of the spring ($h$) in mm./applied load ($g$) in grams.

Figure 4:
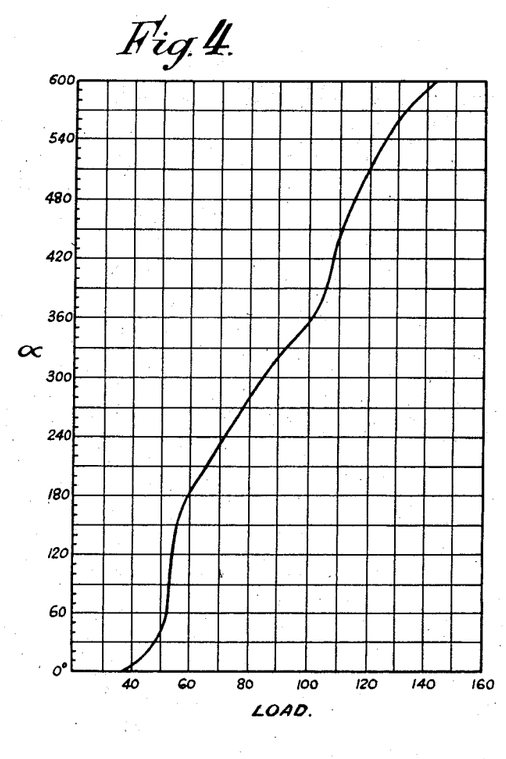

Figure 4 is a plot of the angular disposition of the free end of the spring ($\alpha$)/applied load in grams.

It will be seen from Figures 3 and 4 that considerable deviations from a linear relationship exist, and that at certain loadings the slope of the curve is very steep, indicating increased sensitivity.

Figure 5:
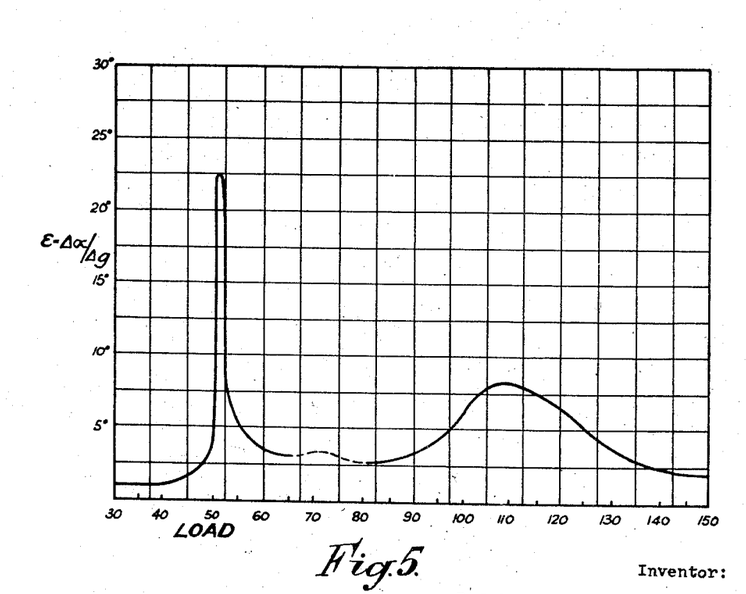

Figure 5 is a plot of the sensitivity for twist ($\epsilon = \Delta\alpha/\Delta g$)/applied load in grams.

Regions of high sensitivity are noted at loadings of about 51 grams and 110 grams.

The spring was then tilted by adjustment of the mounting so that the restrained end of the spring made a small angle ($\psi$) with the horizontal. The convention adopted is $+\psi =$ an initially upward inclination of the spring, $-\psi =$ an initially downward inclination of the spring.

Figure 6:
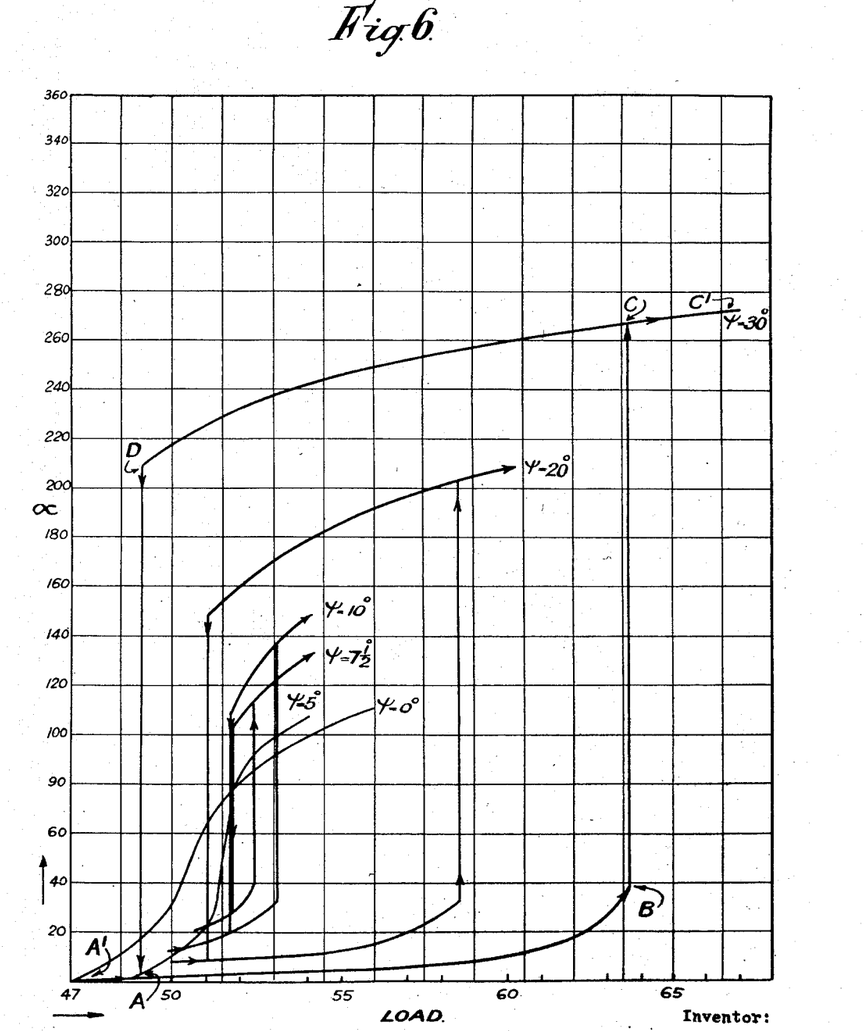

Figure 6 is a plot, at different positive values of $\psi$, of the angular disposition of the free end of the spring ($\alpha$)/applied load in grams.

Assuming, for example, a value of $\psi = +30°$, on increasing the load $g$ the curve A'—B is traversed. At B the spring extends suddenly, the free end lengthening and twisting considerably for a very small increase in load until the position represented by C is reached. Further loading produced a more gradual extension and twist, following the curve, C—C'.

On reducing the loading, the spring does not contract violently at C but continues to follow an extension of the curve C′—C to the point D, when a sudden contraction and twist for a small decrease in loading brings the spring to the conditions represented by A. Further reduction in loading follows the course A—A′.

For the spring employed it was found that on reducing the angle $\psi$ similar curves were obtained on plotting until a value between $\psi = +7.5°$ and $\psi = +5°$ was reached when the abnormal behaviour of the spring disappeared and simple inflection curves were obtained.

The critical angle ($\psi_{cr}$) is defined as the value or values of $\psi$ (+ive or —ive) at which the points A and B coincide.

The critical loading ($g_{cr}$) is defined as the value of $g$ at the point A at the critical angle.

If the spring has a number of turns the conditions illustrated on Figure 6 may recur at higher values of $g$. Thus a spring may have a plurality of values of $\psi_{cr}$ both positive and negative.

The spring is defined as being in a state of extreme sensitivity when it is mounted at an angle approximately equal to $\psi_{cr}$ under a critical loading ($g_{cr}$) corresponding to $\psi_{cr}$.

The spring described with reference to Figure 1 has been found to possess two primary states of extreme sensitivity:

(1) at $\psi_{cr} = +6°$ under load of approximately 51 grams.
(2) at $\psi_{cr} = -19°$ under load of approximately 77 grams.

Secondary and tertiary states of extreme sensitivity are probable at higher values of $g$.

Tilt in a plane at right angles to $\psi$ is designated by the symbol $\Phi$.

Figure 6 as described above illustrates the behaviour of the spring with reference to angle of twist ($\alpha$). It is to be noted, however, that the relationship between $\alpha$ and $h$ for different values of $\psi$ is very nearly linear above and below the zones of instability between the position A and B, and C and D.

Figure 7:
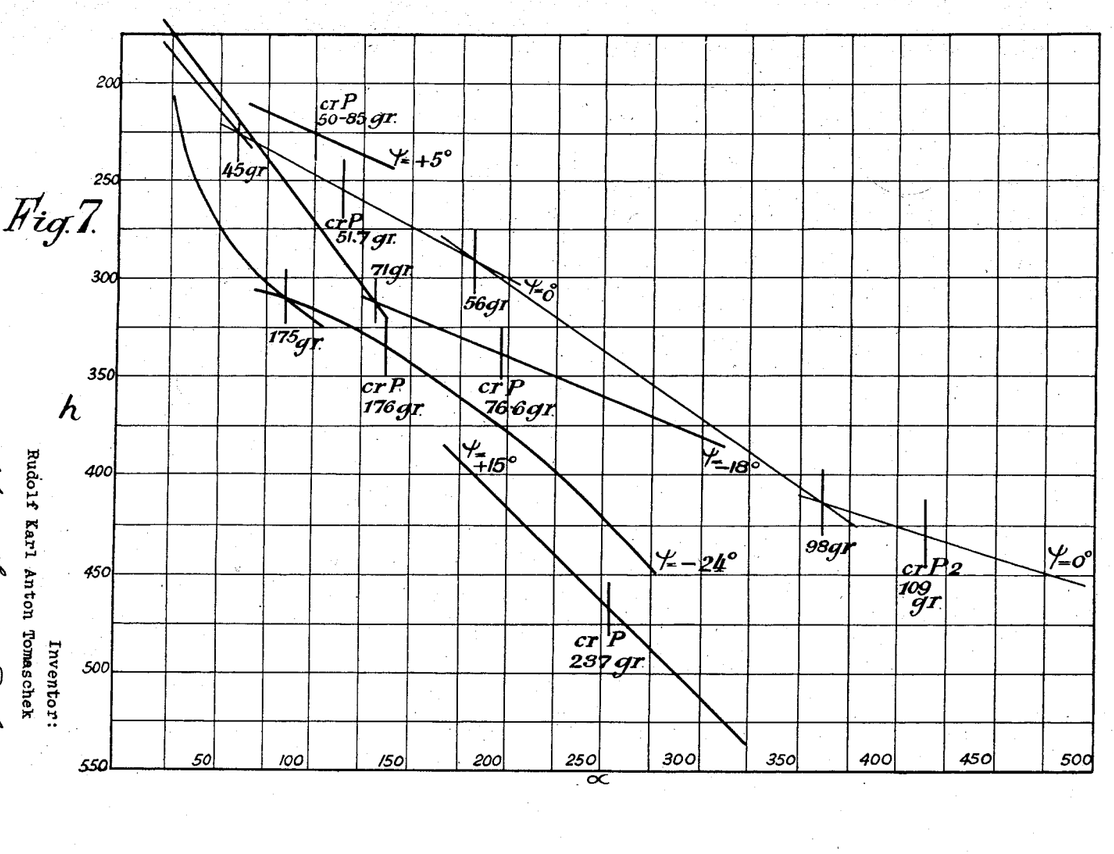

Figure 7 is a plot of $\alpha/h$ at different values of $\psi$. Measurement of indication of small changes in the value of $g$ when operating in the state of extreme sensitivity may thus be made with respect to changes in length or angle or twist.

Figure 2:
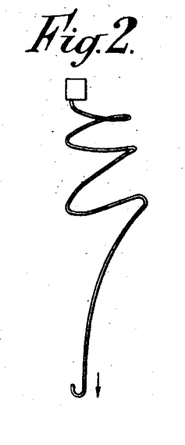
Figure 2 is an elevation of the spring in the extended state.
Figure 8:
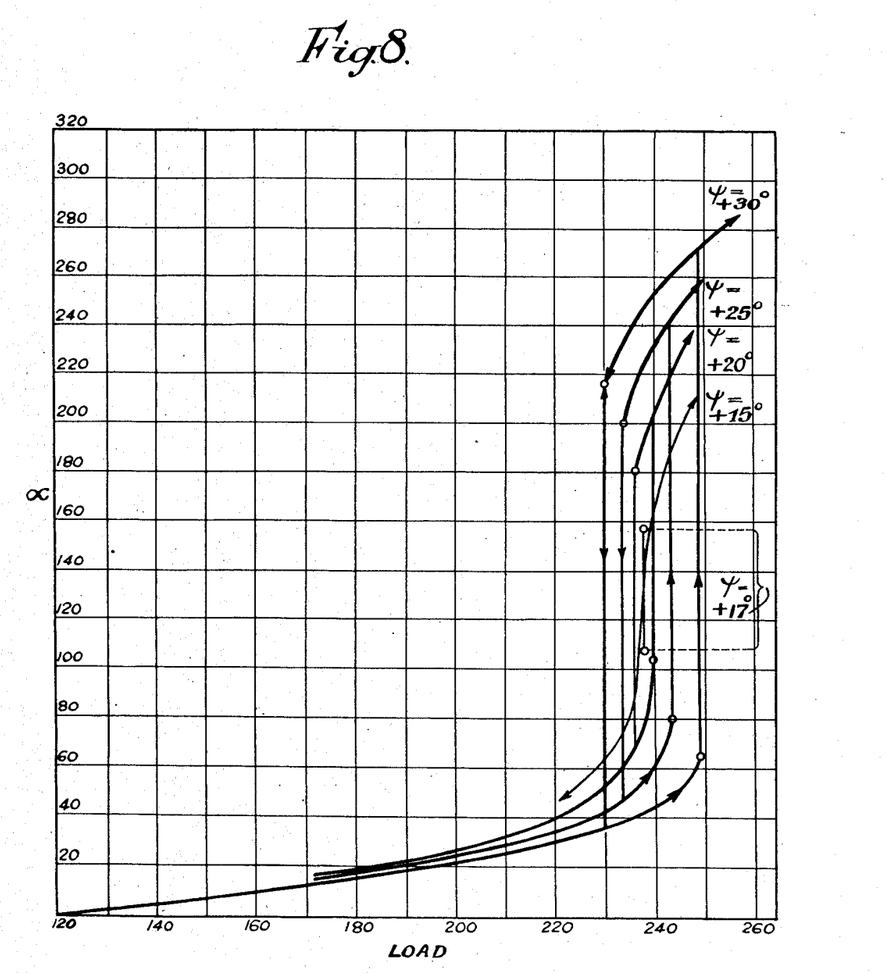
Figures 8 and 9 show plots as determined for another spring.
Figure 9:
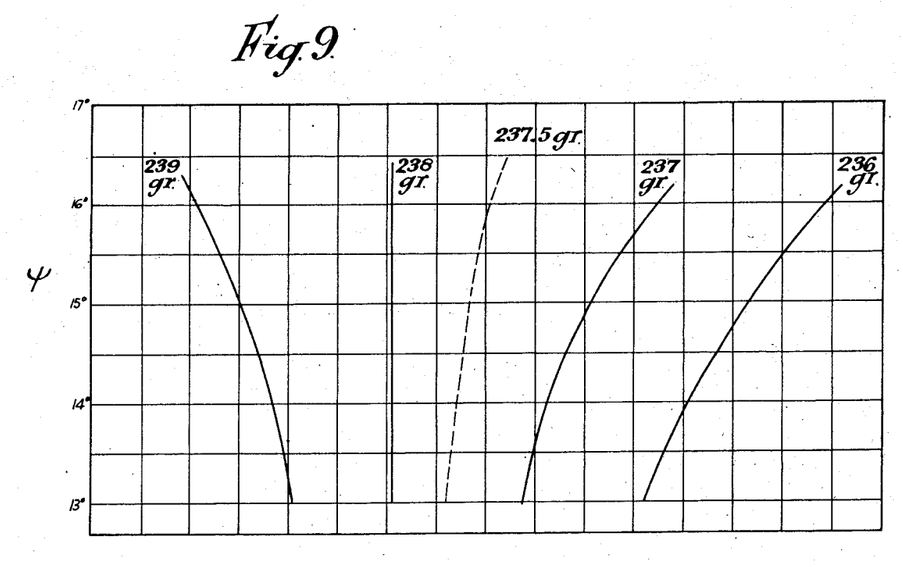

Figures 8 to 9 show plots of the variables hereinbefore described as determined for another spring of the type illustrated in Figures 1 and 2 and having the following dimensions:

| | | |
|---|---|---|
| Length along the spiral | cms | 81 |
| Width | mm | 7.75 |
| Thickness | mm | 0.38 |
| Thus area of cross-section | sq. mm | 2.95 |
| Ratio of width/thickness | | 20.4 |

Free of distorting forces the spring had 3¼ windings.

The outer end was approximately 27 mm. from the centre of the geometric form.

The spring was clamped at its inner end and mounted to permit inclination of the end of the spring while maintaining the longer side of the spring in a vertical plane.

Figure 8 is a plot of $\alpha$/applied load at different values of $\psi$.

A region of high sensitivity is noted at a value of $\psi = +17°$ and a loading of approximately 238 grams.

Figure 9 is a plot of $\psi/\alpha$ for six different values of the load, approximating to the critical loading between 236 and 239 grams.

It is noted that at a value of approximately 238 grams, the distortion is substantially independent of the angle of application of the loading between values of 13° and 17°.

Figure 15:
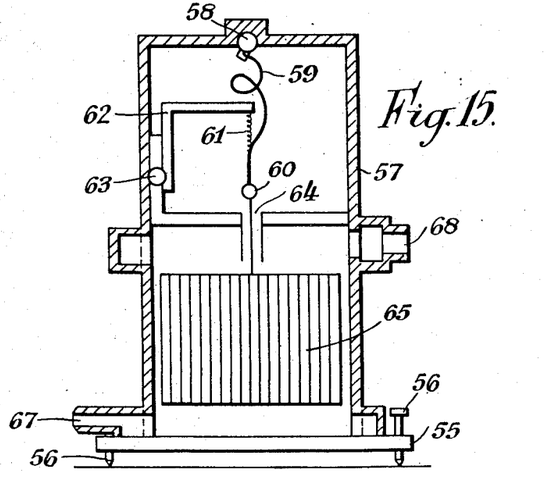
Figure 16:
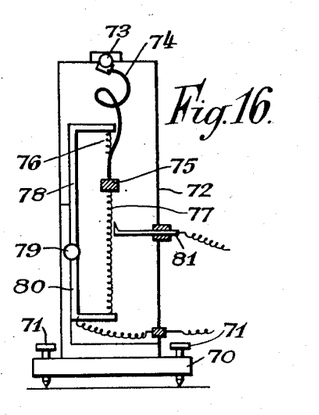
Figure 16 illustrates the invention as applied to a switching instrument.

The invention is illustrated in its application to measuring instruments in Figures 10–15, accompanying this specification, and to a switching instrument in Figure 16 accompanying this specification.

Figures 10–16 are part-sectional elevations of the following instruments:

| Figure | Instrument |
|---|---|
| 10 | Barometer. |
| 11 | Hygrometer. |
| 12 | Thermometer. |
| 13 | Do. |
| 14 | Gas density balance. |
| 15 | Measurement of adsorption. |
| 16 | Heat actuated switch. |

Figure 10:
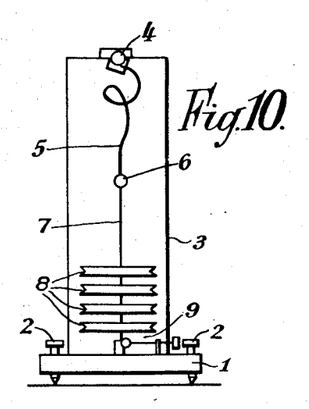
Figures 10–15 illustrate the invention as applied to various measuring instruments.

Figure 10 shows a base plate 1 with adjusting screws 2 and carrying a casing 3 which supports an adjustable spring mounting 4. A sensitive spring 5 is attached at one end to the mounting 4 and at the other end bears a mirror 6 and is attached to a fine torsion wire 7 attached to four conventional pressure diaphragm units 8 arranged in series. The lowest diaphragm is attached to a rack and pinion adjustment 9 for setting the zero position of the instrument. The vertical movement of the mirror is accompanied by twist which may be detected by conventional optical methods.

Figure 11:
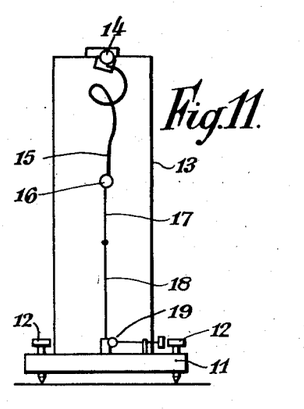

Figure 11 shows a base plate 11 with adjusting screws 12 carrying a casing 13 which supports an adjustable spring mounting 14. A sensitive spring 15 is attached at one end to the mounting 14 and at the other end bears a mirror 16 and is attached to a fine torsion wire 17 attached to a hygrometer hair 18. The lower end of the hair is attached to a rack and pinion adjustment 19 for setting the zero position of the instrument.

Figure 12:
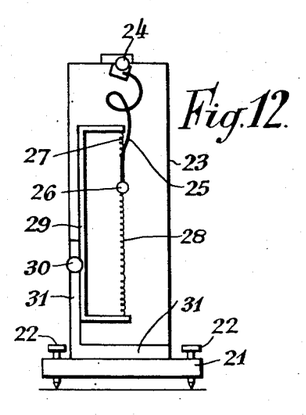

Figure 12 shows a thermometer consisting of a base plate 21 with adjusting screws 22 and carrying a casing 23 which supports an adjustable spring mounting 24. A bimetallic sensitive spring 25 is attached at one end to the mounting 24 and at the other end bears a mirror 26 and is attached to two comparatively weak helical springs 27 and 28 secured by their other ends to a movable support 29 operated by a rack and pinion 30 attached to a rigid support 31.

Figures 13, 14:
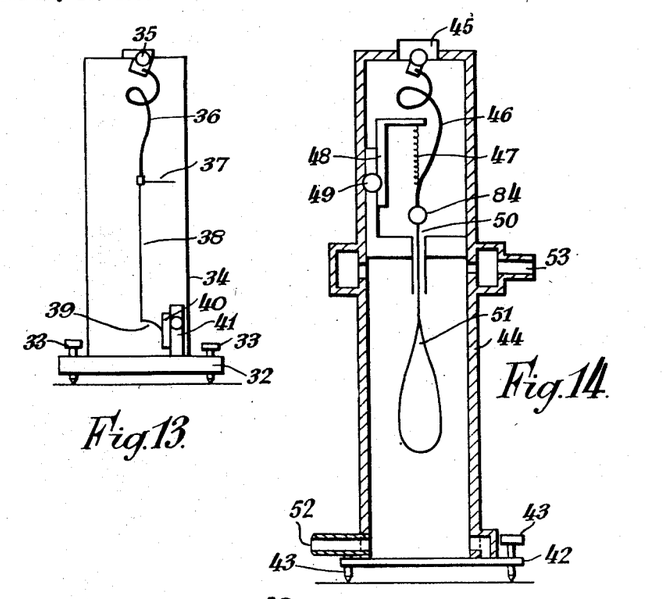

Figure 13 shows a thermometer consisting of a base plate 32 with adjusting screws 33 and carrying a casing 34 which supports an adjustable spring mounting 35. A sensitive spring 36 is attached at one end to the mounting 35 and at the other end bears a pointer 37 and is attached to a torsion wire 38 which is attached to one end of a bimetallic strip 39, the other end of the strip is attached to a movable support 40 operated by a rack and pinion 41.

Figure 14 shows a gas density measuring instrument comprising a base plate 42, with adjusting screws 43 and carrying a sealed casing 44 which supports an adjustable spring mounting 45. A sensitive spring 46 is attached at one end to the mounting 45 and at the other end bears a mirror 84 and is attached to a comparatively weak helical spring 47 secured at its other end to a movable framework 48 operated by a rack and pinion 49. The free end of the sensitive spring 46 is also attached to a torsion wire 50 carrying a light hollow pear shaped vessel 51. The casing 44 is provided with a gas inlet 52 and gas outlet 53.

Figure 15 shows an instrument for measuring or detecting the presence of gases comprising a base plate 55 with adjusting screws 56, and carrying a sealed casing 57 which supports an adjustable spring mounting 58. A sensitive spring 59 is attached at one end of the mounting 58 and at the other end bears a mirror 60 and is attached to a comparatively weak helical spring 61 secured at its other end to a movable framework 62 operated by a rack and pinion 63. The free end of the sensitive spring 59 is also attached to a torsion wire 64 carrying a nest 65 of concentric cylinders of an absorbent material or a material coated with a chemical preparation, whereby the presence of the gas causes the nest 65 to change weight. The casing is provided with a gas inlet 67 and gas outlet 68.

Figure 16 is a heat actuated electrical switch comprising a base plate 70 with adjusting screws 71 and carrying a casing 72 which supports an adjustable spring mounting 73. A sensitive bimetallic spring 74 is attached at one end to the mounting 73 and at the other end bears an electrical contact 75 and is attached to two comparatively weak helical springs 76 and 77 secured at their other ends to a movable framework 78 operated by a rack and pinion 79 attached to a rigid support 80. A second electrical contact 81 is provided to complete closed circuit when the spring 74 extends. The spring 74 is preferably employed in a super critical state corresponding to the section C—B on Figure 6.

In general it is preferred that an instrument according to the present invention be operated under a load such that the distortion is virtually independent of the angle of loading ($\psi$) for small variations of $\psi$. Under these conditions the effect of errors or variations in the levelling of the instrument are minimised.

The following general laws enable the determination of the value of unknown factors when certain characteristics are known.

*Law 1.*—For constructing a sensitive spring for a given weight the following approximative formula (±10%) may be used:

$$W = 0.4 \times \frac{E \cdot h \cdot b^3}{d^2}$$

where
$E$ = modulus of elasticity
$h$ = width of the spring
$b$ = thickness of the spring
$d$ = length of the sensitive part of the spring Taking a spiral spring of 1½ turns in the initial shape and using + inclinations, $d$ can be taken as approximately equal to half of the circumference of the first turning (at the clamped end) of the spiral. When using negative inclinations $W^-$ is approximately equal to 1.5 $W^+$. For $-\psi$ inclination $W^- = 1.25\ W^+$. The shape factor $\sigma$ is supposed to have the value of between 0.03 and 0.9. This factor is defined by $$\sigma = \frac{R_a - R_i}{n \times R_a}$$

where $R_i$ = radius at the inner, clamped end, $R_a$ = radius at the outer end, $n$ = number of windings.

The values obtained are also valid for springs with 3½ windings, but the absolute value of the angles + or − will be different.

The following examples illustrate the calculation of the value of W when other characteristics of the spring are known.

EXAMPLE 1

$h = 0.192$ in.; $b = 0.005$ inch. $E = 1.4\ 10^{10}$ gr./in.$^2$
$R_i = 1.5$;       $= 0.04$ W calc.: 6 gr.   W obs.: 6.6 gr. for + incl. $\phi$
W calc.: 9 gr.   W obs.: 10.6 gr. for − incl. $\phi$
W calc.: 7.0 gr. W obs.: 7.1 gr. for − $\psi$ incl.

EXAMPLE 2

Using a spring having the same characteristics as in Example 1 except that the value of $b = 0.008$ in. the following theoretical and practical results were obtained:

W calc.: 25 gr.   W obs.: 23.0 gr. for + incl. $\phi$
W calc.: 37 gr.   W obs.: 35.5 gr. for − incl. $\phi$
W calc.: 28.5 gr. W obs.: 27.5 gr. for − $\psi$ incl.

*Law 2.*—As the diameter of the spiral increases with $s_0$ (the overall length) if the shape remains similar ($\sigma$ = const.) W is also proportional to $1/s_0^2$ in this case.

*Law 3.*—Another dimension which one wishes to be able to calculate beforehand is the vertical length $l_{cr}$ of the spring in its sensitive state compared with the overall length $s_0$. The ratio $$\frac{l_{cr}}{s_0}$$

is independent of $b$, $h$, and $W$, so that all springs of the same length and shape show the same ratio of $$\frac{l_{cr}}{s_0}$$

for the same angle of inclination.
The ratio of $$\frac{l_{cr}}{s_0} = I\ (= \text{relative working length})$$

is given in the following table:

*I values*

| $+\psi$ | $-\psi$ | $-\phi$ | Turns |
|---|---|---|---|
| 0.41 | 0.64 | 0.53 | 1½ |
| 0.25 | 0.41 | 0.33 | 3½ |

The ratio of $I^{1\ 1/2}$ to $I^{3\ 1/2}$ is for every shape 1.6.

It is apparent that $+\psi$ inclination gives the shortest and $-\psi$ inclination the longest relative working length.

*Law 4.*—The ratio between lengthening and twisting of the spring. (K mm./degree) is a linear function of $s_0$ and therefore also of $l_{cr}$. According to the figures given in the section above K is lowest for $+\psi$ and increases for $-\phi$ and then for $-\psi$.

For 1½ turns and $s_0 = 150$ mm. K is in the order of magnitude of 0.3 mm./degree for $-\phi$ and increases to 0.6 for $s_0$ of about 400 mm.

For the same value of $l_{cr}$ the value of K is substantially lower for 3½ turns than for 1½ turns.

The invention is further illustrated but in no way limited with reference to the following examples.

EXAMPLE 3

A steel clock spring of width ($h$) 0.755 inch, breadth ($b$) 0.008 inch, $h/b$ ratio of 94 and comprising 1½ turns was investigated to determine its states of extreme sensitivity. These were found to occur under the conditions shown in the following table.

|  | Angle of inclination, degrees | W. (grams) | $l_{cr}$ (cms.) |
|---|---|---|---|
| $+\psi$ | 8  | 75.3  | 15.3 |
| $-\psi$ | 27 | 120.1 | 23.1 |
| $-\phi$ | 8  | 85.6  | 19.0 |

EXAMPLE 4

A steel clock spring of width ($h$) 0.755 inch, breadth ($b$) 0.008 inch, $h/b$ ratio of 94 and comprising 3½ turns was investigated to determine its states of extreme sensitivity. These were found to occur under the conditions shown in the following table.

|  | Angle of inclination, degrees | (W. grams) | $l_{cr}$ (cms.) |
|---|---|---|---|
| $+\psi$ | 14 | 61.8  | 16.9 |
| $-\psi$ | 20 | 99.4  | 28.0 |
| $-\phi$ | 4  | 124.3 | 38.2 |
|    | 15 | 81.1  | 22.  |

Instruments incorporating a spring according to the invention may be provided with:

(a) A mass or hollow sphere at the free end of the spring, for the measurement, for example, of density, acceleration or of the force of gravity;

(b) A magnetic material or an electromagnetic coil for the measurement of magentic field, and thus, by employing a static electromagnetic coil for the measurement of electrical values such as current strength, voltage, etc.;

(c) An electrode, for use in conjunction with a second fixed electrode for the measurement of electro-static forces;

(d) A hair in tension, for use as a hygrometer;

(e) A bimetallic strip, for measurement of temperature;

(f) A pressure sensitive diaphragm, for barometric measurements;

(g) An absorbent or chemically treated mass, for the indication of the presence of traces of chemicals by adsorption, chemical reaction, etc.

The above examples of the application of the invention are by way of illustration, and the invention is in no way limited thereby.

The measurement of the distortion produced in the spring under the action of an applied force may be made with reference to the linear distortion of the spring, for example, by observation with a travelling microscope, or by effecting variations in the capacity of a variable condenser. Alternatively measurement of the distortion produced in the spring may be made with reference to the angular displacement of the free end of the spring, for example, by measuring the displacement of a beam of light reflected in a mirror secured to the spring.

If desired electrical contacts may be provided whereby an electrical circuit is closed by the spring on extension to a given length or rotation, at the free end, through a given angle. By calibration against a known standard the result may be used to give an accurate indication when an applied force is of a predetermined magnitude and, through the use of relays, to operate other apparatus in response to the closing of the circuit.

It is of particular advantage of an instrument according to the invention that the sensitivity of the instrument is independent of the absolute size of the spring, for example, the number of turns or the length of the spring.

This feature is of particular advantage in the construction of instruments which must necessarily be of small overal dimensions, such as certain types of gravimeters. This aspect of the invention is more particularly described in our copending application No. 161,167, filed May 10, 1950.

It is frequently advantageous that the action of the sensitive spring should be modified by the use of a subsidiary helical spring of conventional type connected in parallel. The subsidiary spring should be very weak in comparison with the sensitive spring and its action is to restrict the movement of the sensitive spring outside the operating range of movement and to stabilize the action of the sensitive spring.

I claim:

1. An instrument for the accurate measurement of a linear force, said instrument comprising a coiled spring of diminishing radius of curvature towards one end thereof of material having a cross-section of width/thickness ratio in the range of 10:1 to 100:1, the spring constituting not substantially less than 1.25 turns in the unextended state, means attached to one end of the spring, capable of linear movement under the action of the linear force, and a mounting for the other end of the spring to support the spring so that the axis of the spring, in the unextended state, subtends an angle in the range of from 5° to 85° to the direction of the linear force, the angle being such that, under the influence of the linear force the spring is extended into a state of extreme sensitivity.

2. An instrument as specified in claim 1 in which the angle of inclination of the axis of the spring to the direction of the applied force lies in the range 10°–40°.

3. A barometer of high sensitivity comprising a coiled spring of diminishing radius of curvature towards one end thereof of material having a cross-section of width/thickness ratio in the range of 10:1 to 100:1 the spring constituting not substantially less than 1.25 turns in the unextended state, at least one pressure responsive diaphragm attached to one end of the spring and a mounting for the other end of the spring to support the spring so that the axis of the spring, in the unextended state, subtends an angle in the range of from 5° to 85° to the direction of the linear force applied by said diaphragm to the end of the spring attached thereto, the angle being such that, under the influence of the linear force the spring is extended into a state of extreme sensitivity.

4. A thermometer of high sensitivity comprising a coiled spring of diminishing radius of curvature towards one end thereof and of material having a cross-section of width thickness ratio in the range of 10:1 to 100:1, the spring constituting not substantially less than 1.25 turns in the unextended state; a bimetallic strip rigidly fixed at one end and, at the other end, secured to one end of the spring; and, a mounting for the other end of the spring to support the spring so that the axis of the spring, in the unextended state, subtends an angle in the range of from 5° to 85° to the direction of the linear force applied by said metallic strip to the end of the spring attached thereto, the angle being such that under the influence of the linear force the spring is extended into a state of extreme sensitivity.

5. A gas density measuring instrument of high sensitivity comprising a coiled spring of diminishing radius of curvature towards one end thereof and of material having a cross-section of width/thickness ratio in the range of 10:1 to 100:1, the spring constituting not substantially less than 1.25 turns in the unextended state; a light hollow body adapted for linear movement within a gas chamber, secured to one end of the spring; and, a mounting for the other end of the spring to support the spring so that the axis of the spring, in the unextended state, subtends an angle in the range of from 5° to 85° to the direction of the linear force applied by said body to the end of the spring attached thereto, the angle being such that, under the influence of the linear force, the spring is extended into a state of extreme sensitivity.

6. An instrument of high sensitivity for measuring or detecting the presence of gases comprising a coiled spring of diminishing radius of curvature towards one end thereof and of material having a cross-section of width/thicknes ratio in the range of 10:1 to 100:1, the spring constituting not substantially less than 1.25 turns in the unextended state; means for the indication of the presence of gases secured to one end of the spring; and, a mounting for the other end of the spring to support the spring so that the axis of the spring, in the unextended state, subtends an angle in the range of from 5° to 85° to the direction of the linear force applied by said gas-indicating means to the end of the spring attached thereto, the angle being such that under the influence of the linear force the spring is extended into a state of extreme sensitivity.

7. A heat-actuated electrical switch of high sensitivity comprising a bimetallic coiled spring of diminishing radius of curvature towards one end thereof and of material having a cross-section of width/thickness ratio in the range of 10:1 to 100:1, the spring constituting not substantially less than 1.25 turns in the unextended state; means including electrical contact means attached to one end of the spring; and, a mounting for the other end of the spring to support the spring so that the axis of the spring, in the unextended state, subtends an angle in the range of 5° to 85° to the direction of the linear force applied by said electrical contact-containing means to the end of the spring attached thereto, the angle being such that, under the influence of the linear force, the spring is extended into a state of extreme sensitivity.

References Cited in the file of this patent

UNITED STATES PATENTS

| Number | Name | Date |
|---|---|---|
| 2,087,354 | Muffly | July 20, 1937 |
| 2,131,739 | Holt | Oct. 4, 1938 |
| 2,239,049 | Morris | Apr. 22, 1941 |
| 2,293,437 | LaCoste | Aug. 18, 1942 |